United States Patent [19]
Bertling

[11] 4,075,993
[45] Feb. 28, 1978

[54] FUEL MIXTURE CONTROL APPARATUS

[75] Inventor: Johannes-Gerhard Bertling, Vaihingen, Germany

[73] Assignee: Robert Bosch GmbH, Stuttgart, Germany

[21] Appl. No.: 717,379

[22] Filed: Aug. 24, 1976

[30] Foreign Application Priority Data

Sep. 3, 1975 Germany .............................. 2539099

[51] Int. Cl.² .................... F02M 23/00; F02M 23/04; F02M 11/02
[52] U.S. Cl. ......................... 123/119 EC; 123/124 R; 123/124 A; 123/124 B; 123/119 DB; 261/23 A
[58] Field of Search .......... 123/124 R, 124 A, 124 B, 123/119 D, 119 DB, 127, 119 EC, 139 AW, 32 EA; 261/23 A

[56] References Cited

U.S. PATENT DOCUMENTS

| 2,609,806 | 9/1952 | Winkler | 261/23 A X |
| 3,364,911 | 1/1968 | Baudry et al. | 123/127 |
| 3,365,179 | 1/1968 | La Force | 261/46 X |
| 3,831,909 | 8/1974 | Freismuth | 261/46 X |
| 3,903,211 | 9/1975 | Kono et al. | 261/23 A |
| 3,977,375 | 8/1976 | Laprade et al. | 123/124 B |
| 4,010,722 | 3/1977 | Laprade et al. | 123/124 R |
| 4,014,960 | 3/1977 | Goto et al. | 261/23 A |

Primary Examiner—Wendell E. Burns
Attorney, Agent, or Firm—Edwin E. Greigg

[57] ABSTRACT

The air induction tube of an internal combustion engine has an air flow rate meter which is displaced pivotably by the air stream. Connected to the pivoting element is a pressure cell which provides the restoring force for the moving element. The pressure of this cell is determined by the pressure in an air bypass line and by the actuation of valves connected to a constant pressure source. The bypass line also contains a pressure control valve which controls the amount of fresh air fed to the engine and a flow valve whose displacement is coupled to the air flow rate meter.

24 Claims, 4 Drawing Figures

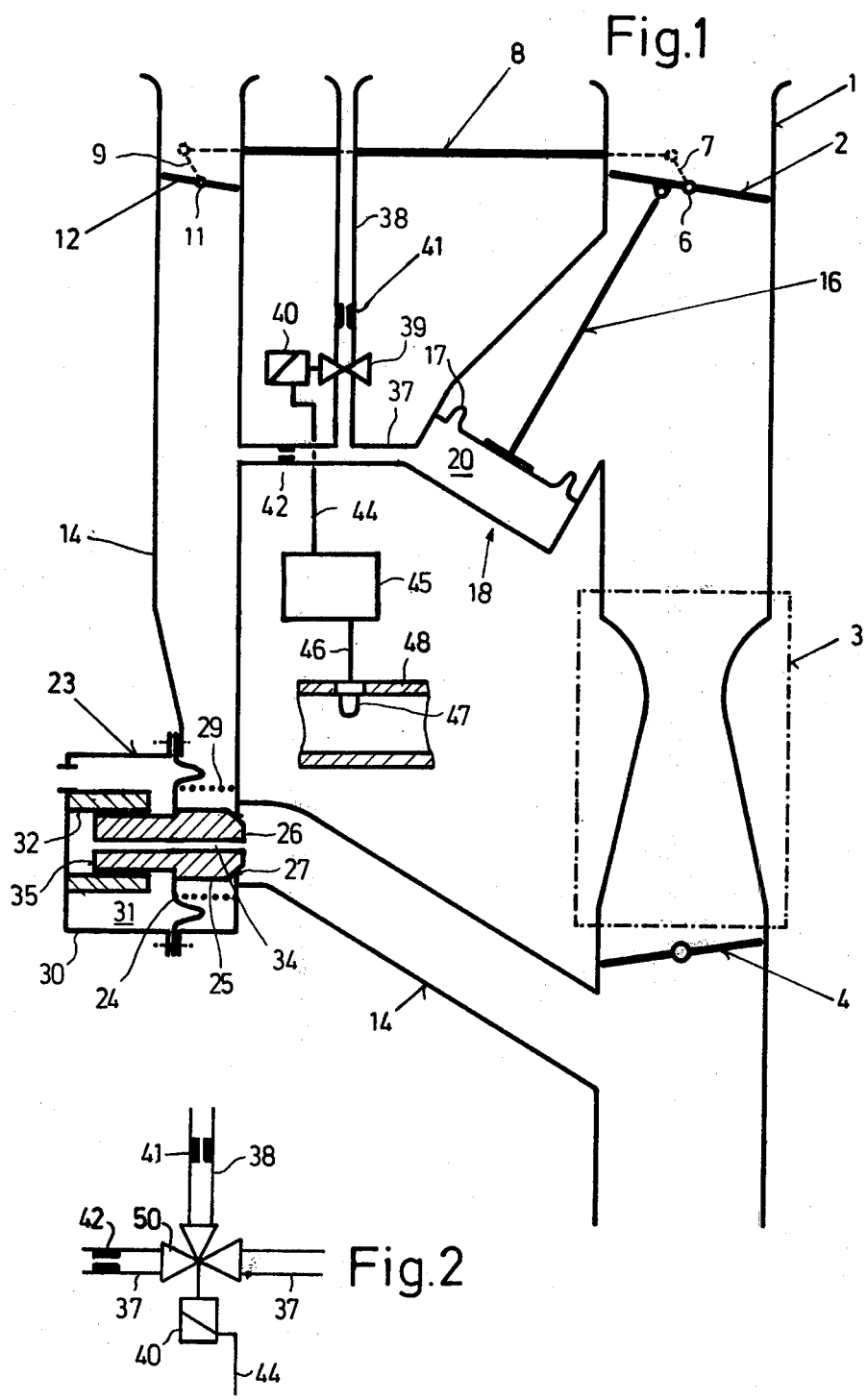

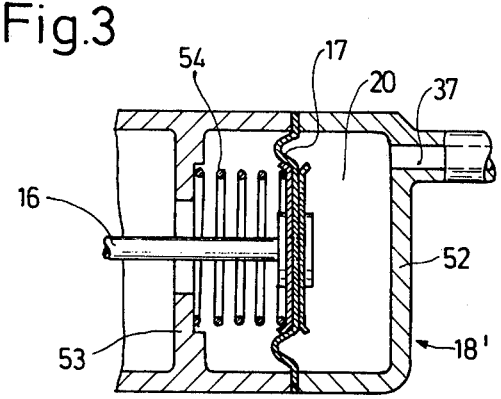
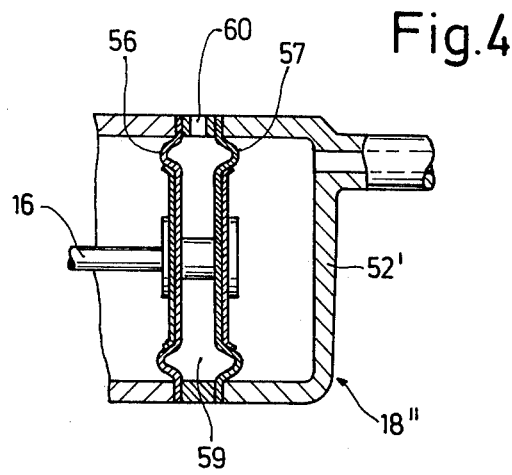

FUEL MIXTURE CONTROL APPARATUS

BACKGROUND OF THE INVENTION

The invention relates to a method and an apparatus for regulating the fuel-air mixture provided to an internal combustion engine. The regulation includes the supply of supplementary air to be added to a fuel-air mixture generated in a mixture generator in dependence on the operational state of the internal combustion engine.

In a known method of this kind, an oxygen sensor measures the oxygen content of the exhaust gases. The sensor is preferably an oxygen-ion conducting solid electrolyte, e.g., Zirconium dioxide. The output signal from the sensor is fed to a controller which sets an air bypass valve. If the oxygen content of the exhaust is low, indicating a rich mixture, the bypass valve is opened and the mixture is leaned out. Since this method employs only the oxygen sensor signal for setting the bypass valve, the relative adjustment of the fuel-air mixture is substantially smaller for large air flow rates (open throttle) than for small air flow rates.

In another known method of this type, the oxygen content of the exhaust gases is again monitored and additional air is metered out by a bypass valve in dependence on the exhaust gas oxygen content. In that system, an electronic controller determines the throttle position as well as the engine rpm to define a basic setting of the bypass valve while the oxygen content in the exhaust gases superimposes a further opening motion of the valve. Thus, fuel mixture preparation is independent of air flow. This type of known regulation requires a fairly substantial and expensive controller. Furthermore, the quantity of actually aspirated fuel-air mixture can be determined only by the throttle valve position together with the rpm signal or the vacuum in the induction tube. Thus, two measured quantities are required in order to find the parameter whose exact measurement is most important and that parameter is then processed to provide a setting signal for the bypass throttle valve.

OBJECT AND SUMMARY OF THE INVENTION

It is a principal object of the invention to provide a method and an apparatus for rapid and precise fuel mixture regulation while maintaining a relatively low cost.

This and other objects are attained, according to the invention, by providing an air flow rate meter which determines the aspirated air quantity and by admitting supplementary air in a bypass line depending on the displacement of the air flow meter element. The bypass line includes a throttling valve which keeps the downstream pressure in the bypass constant. The reference pressure acting on the air flow meter is made to vary between the constant bypass pressure and another constant pressure, as a function of engine operational data.

In an apparatus provided to carry out the above method, there is provided, in an internal combustion engine which has a mixture generator and a throttle valve in the induction tube, an air bypass line which terminates in the induction tube downstream of the throttle valve. The free flow cross section of the air bypass line may be changed by a flow valve. Upstream of the mixture generator, the induction tube includes an air flow rate meter which has a movable element that changes the free cross section of the induction tube. The movable element is actuated by the pressure difference existing between an adjustable reference pressure and the pressure prevailing downstream of the air flow rate meter. The movable valve element is connected to the flow valve in the bypass line. The apparatus according to the invention further provides a pressure control valve located downstream of the flow valve in the bypass line. A connection tube transmits the pressure in the air bypass line between the flow valve and the pressure control valve to the movable valve element of the air flow rate meter as a reference pressure. Instead of this reference pressure, the movable element of the induction tube valve may receive partially or entirely a substantially different constant pressure admitted by a valve which responds to the operational behavior of the engine.

In this manner, the air quantity fed to the engine is rapidly measured and the supplementary air required is exactly and rapidly adjusted. The multiplicative alteration of the reference pressure which defines the position of the air flow rate meter and hence, at the same time, that of the flow valve and the bypass line, results in a very rapid and precise regulation of the fuel-air mixture with relatively low cost.

In an advantageous feature of the invention, the exhaust system includes an exhaust gas sensor, in particular a per se known oxygen sensor, for measuring the composition of the exhaust gas which characterizes the operational behavior of the engine. The output signal of the sensor operates a valve which selects the pressure admitted to the movable air flow meter valve element.

By recognizing the composition of the exhaust gases and adjusting the mixture accordingly, the mixture is made suitable for obtaining a low degree of toxic exhaust constituents.

Another advantageous version of the invention provides that the fluctuation of the pressure in the combustion chambers of the engine is measured by appropriate transducers. In particular, an engine smoothness transducer is provided for monitoring the operation of the engine and the selector valve is actuated depending on the magnitude of the transducer signal via a suitable controller.

Another feature of the invention is that the connection line between the air bypass and the movable flow meter valve element includes a fixed throttle as does the line originating at the source of constant pressure. The dimensions of these throttles can be made to correspond to the desired rates of change of the pressures. They can also be used to determine the maximum working pressure admitted to the valves.

In another favorable embodiment of the invention, the valve located in the lines connecting the air passages is a three-way valve from which a line branches off to the source of constant pressure, while a throttle is located between the three-way valve and the air bypass line. This has the advantage that, depending on the actuation of the three-way valve, the movable member of the air flow meter is exposed exclusively either to the constant pressure in the bypass line or to the constant pressure of the source. If, as is also provided by the invention, the source of constant pressure is the ambient air or the pressure in the induction tube upstream of the air flow rate meter, the entire pressure difference existing between these two pressures can be used for control purposes. At the same time, intermediate positions of the three-way valve may be exploited for providing analog control of intermediate mixed pressures.

The invention will be better understood as well as further objects and advantages thereof become more apparent from the ensuing detailed description of several exemplary embodiments of the invention.

BRIEF DESCRIPTION OF THE DRAWING

FIG. 1 is an illustration of a first exemplary embodiment of the apparatus of the invention in a longitudinal cross-sectional side view;

FIG. 2 is a detailed illustration of a three-way valve usable in the embodiment of FIG. 1;

FIG. 3 is a sectional diagram of a movable valve element; and

FIG. 4 is a second exemplary embodiment of the movable valve element.

DESCRIPTION OF THE PREFERRED EMBODIMENTS

Turning now to FIG. 1, there will be seen the illustration of a portion of the induction system of an internal combustion engine, not further shown. In the direction of the air flow, the induction tube contains, seriatim, an air valve 2, a mixture generator 3 and an arbitrarily actuatable throttle 4. The air valve 2 is embodied as a plate which, in its terminal position is capable of obturating the induction tube and which is mounted symmetrically on a shaft 6. The plate is a part of an air flow rate meter whose movable element includes an actuating rod 16 which is pivoted eccentrically on the air valve 2 and whose other end is connected to a control diaphragm 17 of a pressure cell 18. The control diaphragm 17 defines a control pressure chamber 20 whose opposite side is exposed to the induction tube pressure prevailing between the air valve and the mixture generator 3. A bypass line 14, for supplying fresh air, terminates in the induction tube downstream of the throttle 14. Provided within the bypass line 4 is a bypass flow valve 12 which pivots about a shaft 11. The shaft 11 is connected by a lever 9 and linkage 8 to a further lever 7 attached to the shaft 6 of the air flow plate 2. The bypass flow valve is mounted symmetrically on the shaft 11 and thus has no differential pressure torque. It would be possible to mount the air valve 2 and the bypass valve on the same shaft, in which case the shaft 11 would be an extension of shaft 6 and the linkage 8 could be dispensed with.

The mixture generator is illustrated symbolically as a Venturi but could be of any suitable construction, for example it could be a carburetor or a fuel injection system.

Located in the air bypass line 14 between the bypass flow valve 12 and the induction tube 1 is a pressure control valve 23 which serves to hold constant pressure in the region downstream of the flow valve 12. In the usual manner, the pressure control valve 23 consists of a control diaphragm 24 to which is affixed a valve closing member 25 whose conical face 26 controls the flow through an orifice 27 in the bypass line 14. The diaphragm is urged in the opening direction of the valve by the pressure in the bypass line 14 prevailing upstream of the orifice 27, as well as by a spring 29. In the opposite direction, the control diaphragm is affected by atmospheric pressure prevailing within a pressure cell 30 which defines a work chamber 31. Preferably, the communication to the atmosphere takes place through a filter, for example through the intake filter of the engine (not shown). The valve closing element 25 is tightly guided in a bore 32. It also includes an axial bore 34 which creates a passage between the bore 32 and the bypass line 14 downstream of the orifice 27. Due to the presence of this bore, the faces 35 and 26 of the valve element 25 experience the same pressure so that, even when the induction tube vacuum is high, the pressure on the valve closing element is always equalized. The pressure could also be equalized by a connecting tube disposed within or without the housing of the pressure control valve 23, which provides communication between the bore 32 and the air bypass line 14 downstream of the orifice 27.

Branching off from the bypass 14, between the flow valve 12 and the pressure control valve 23, is a line 37 leading to the work chamber 20 of the pressure cell 18. Further branching off from the connecting line 37 is a pressure line 38 including a valve 39 which is actuated by an electromagnet 40. The pressure line 38 also includes a throttle 41 while a throttle 42 is disposed in the connecting line 37 between the air bypass 14 and the branch pressure line 38.

The electromagnet 40 is controlled through an electric connection 44 by a controller 45 which receives its input data through a line 46 from a per se known oxygen sensor 47 located in a portion 48 of the exhaust gas system of the engine, not further shown. In known manner, the oxygen sensor 47 generates an output signal which changes potential abruptly when the surrounding gas reaches a composition in which the air number $\lambda$ obeys $\lambda = 1$ and this output signal is used as an input to the controller 45. Controllers and sensors of this type have been described in several publications and will not be further explained here. Such controllers are capable of regulating values of the air number which are less or greater than 1. Depending on the particular design of the controller, the electromagnet 40 of the valve 39 receives a control pulse which either closes or opens the valve. Also known are regulators or controllers in which the electromagnet is displaced in analog manner, i.e., depending on the magnitude or the frequency of occurrence of the sensor signal, permitting thereby a continuous change of the flow cross section of the valve 39. Finally, the valve 39 may also be cyclically actuated by a suitably designed controller in which case the on/off ratio would be chosen to provide an effective flow cross section per unit time in correspondence with the sensor signal.

The apparatus according to the invention operates as follows: When the engine operates in a particular domain, and the throttle 4 is opened further, the pressure change is transmitted toward the air valve 2 resulting in a reduction of pressure in the induction tube region between the air valve 2 and the mixture generator 3 and thereby introducing a pressure difference across the control diaphragm 17. This pressure difference so displaces the air flap that the fresh air flowing into the induction tube recreates the original pressure downstream of the air flap and the same forces are effective on both sides of the control diaphragm 17. Thus, the pressure in the pressure control chamber is approximately equal to that in the induction tube downstream of the air valve 2. The pressure control chamber receives pressure from the air bypass region between the flow valve 12 and the pressure control valve 23 as long as the valve 39 is closed. The pressure control valve 23 regulates the pressure in that region to a constant value which is predetermined by the force of the spring 29 and the effective surface of the control diaphragm 24.

When the rpm or the throttle valve position changes, and thus the air flow rate changes, the air valve 2 is displaced until the forces across the control diaphragm 17 are again equal. At the same time, the bypass flow valve 12 is displaced in the same sense. The increasing pressure in the air bypass 14 is then equalized by the pressure control valve 23 by the increase of the flow cross section of the orifice 27 so that an appropriate additional quantity of supplementary air is provided to the induction tube. However, if the oxygen sensor recognizes a lack of oxygen in the exhaust gas, the controller 45 opens the valve 39. At this time, air at higher pressure may flow to the control pressure chamber 20 through pressure line 38, which may be connected to ambient air or preferably with the induction tube immediately downstream of an air filter, not further shown. The increased reference pressure thus opens the air valve further until approximately the same pressure exists in the induction tube region downstream of the air valve and the control diaphragm 17 is again in equilibrium. Accordingly, the fresh air quantity fed through the air bypass line 14 is increased.

The maximum pressure available in the pressure control chamber 20 is defined by the throttles 41 and 42. Furthermore, the dimensions of these throttles may be chosen to adapt the rates of pressure increase and decrease according to the position of the valve 39, so as to obtain the desired control behavior. If the valve 39 is a valve with a continuously controllable cross section (a proportional valve), the throttle 41 may be dispensed with. If the lines 37 and 38 and the volume of the control pressure chamber 20 are properly chosen, both throttles 41 and 42 may be left out. In this manner, an integral control behavior may be obtained pneumatically. In order to further improve the integral behavior, an additional volume may be provided in the control pressure chamber.

If at the conclusion of the above processes, the oxygen sensor now senses an excess of oxygen, the valve 39 is closed again, and the reference pressure in the pressure control chamber 20 of the pressure cell 18 is lowered again. Thus, the air valve and the bypass flow valve 12 move back into the direction of closure.

In the illustrated exemplary embodiment of FIG. 1, the throttling device of the bypass line is a bypass flap valve. It will be understood that any other suitable adjustable throttle elements, such as slides, rotating valves and other similar throttles could be used in its place. In the same manner, the mechanical linkage between the air valve and the bypass valve may be replaced by a suitable electro-mechanical linkage or a pneumatic or hydraulic linkage. The air flow rate meter illustrated may also be replaced by any other known and suitable air flow rate meter which operates on the basis of the differential pressure so as to maintain a substantially constant pressure downstream thereof. For example, a constant pressure carburetor or a known air flow rate meter in which a baffle plate displaces a lever in opposition to a substantially constant restoring force would be suitable. If the air flow rate meter is already a part of the mixture generator 3, the displacement of the air flow rate meter may be transmitted to any suitable throttle element in the air bypass line in any suitable manner. The pressure control valve in the embodiment described above may be replaced by a throttle flap valve controlled by a pressure cell.

FIG. 2 illustrates an embodiment which shows how the simple valve 39 may be replaced by a three-way valve 50 located in the connection line 37 at the branch-off point of the pressure line. The remaining elements are the same as before and in particular the throttle 42 is located between the valve 50 and the air bypass line 14, while the throttle 41 is located in the pressure line 38. As illustrated in the embodiment of FIG. 1, the three-way valve is also controlled by the controller 45 which in turn receives data from an exhaust gas sensor 47 located in a region 48 of the internal combustion engine. Advantageously, the three-way valve 50 is actuated by the controller in analog manner according to the sensor signal. Thus, the appropriate adjustment of the valve permits providing a mixed pressure intermediate between the pressure of the bypass line 14 (as between the pressure control valve 23 and the flow valve 12) on the one hand, and the external pressure on the other hand. As before, the purpose of the throttles 41 and 42 is primarily for adapting the rates of pressure increase and decrease. The three-way valve 50 may also be an electromagnetically actuated switching valve (3/2 valve) which is actuated in cyclic manner. Such a valve simplifies the design of the controller. Similarly, it would be possible to use two simple on/off valves operating in opposite phase.

Instead of using external pressure for supplying pressure through the line 38 to the pressure control chamber 20, any other source of constant pressure may be used, the magnitude of which may be above or even below the pressure prevailing in the air bypass 14, suitable changes being made in the design of the movable valve element or its actuation.

In principle, the valves 39 and 50 could be made dependent in their operation on other engine parameters by employing a suitable controller. For example, the engine smoothness may be used as a characterizing parameter of engine operation. If this method of control is used, an appropriate and known transducer monitors the fluctuation of pressure in the combustion chambers of the engine. It has also been proposed to use the magnitude of the ion currents in the combustion chambers of the engine for controlling the mixture fed to the engine. All these methods of control may be used with the apparatus and the process of this invention. The exhaust gas composition which is used in the preferred example to control the apparatus may also be determined by other suitable means, for example indirectly by measurement of the exhaust gas temperature.

FIG. 3 illustrates an actual embodiment of the moving element of the air valve 2. The pressure cell 18' is a housing 52 opened at one side in the direction of the induction tube. The housing sealingly encloses the control diaphragm 17 and thereby defines a control pressure chamber 20. This chamber is connected through a line 37 with the air bypass conduit 14. Fastened to the control diaphragm is an actuating rod 16. Resting on a shoulder 53 of the housing 52 and urging the control diaphragm is a soft spring 54 whose purpose it is to hold the control diaphragm 17 in a well-defined initial position so that, when the pressure in the control chamber changes, the response time is kept as small as possible. Depending on the direction of the forces normally acting in the rest condition of the apparatus, the spring could be located in the control pressure chamber 20 instead of being disposed as illustrated.

FIG. 4 illustrates a further embodiment of the movable valve element 18. A housing 52' of a pressure cell 18" has two mutually symmetric and parallel control diaphragms 56 and 57. The tightly sealed volume 59 between the two diaphragms may be filled up with a medium at higher pressure than the maximum pressure ever prevailing in any of the adjacent work chambers. For example, as illustrated in FIG. 4, the intermediate chamber 59 may be connected to the atmosphere through a bore 60, thereby obtaining a defined position of the diaphragms. In that case, the effective surface areas of the two diaphragms may be made of different size, so that an increase or decrease of the reference or control pressure is possible. In all other ways, the pressure cell 18" is constructed in the same manner as the pressure cell 18' of FIG. 3.

The foregoing relates to preferred embodiments of the method and apparatus of the invention, it being understood that numerous variants thereof are possible within the spirit and scope of the invention, the latter being defined by the appended claims.

What is claimed is:

1. A method for controlling the fuel mixture of an internal combustion engine, said engine including a fuel mixture generator and an air intake tube, comprising the steps of:
   measuring the air flow rate through said air intake tube;
   adjusting said air flow rate in response to pressure variations;
   providing an air bypass conduit with a flow valve at its inlet for admitting supplementary air to the engine and controlling the quantity of supplementary air depending on the measured air flow rate;
   maintaining a constant pressure downstream of said flow valve;
   and further controlling said quantity of supplementary air by varying a reference pressure in the pressure control chamber used in measuring the air flow rate between a first constant pressure and a second constant pressure.

2. In an apparatus for controlling the fuel mixture of an internal combustion engine, said engine including a fuel mixture generator and an air intake tube in which is disposed a throttle valve, the improvement comprising, in combination:
   an air bypass conduit, terminating in said air intake tube downstream of said throttle valve for supplying supplementary air to said intake tube;
   first flow control means, disposed within said bypass conduit, for adjusting the free flow cross section
   an air flow rate meter, disposed in said air intake tube upstream of said mixture generator and including a movable air flow control element, actuated by the difference between a reference pressure and the pressure downstream of said air flow rate meter and coupled to said first flow control means for simultaneous actuation of said meter and said first flow control means;
   a pressure control valve disposed in said air bypass line downstream of said first flow control means;
   a connecting line for establishing communication between a region of said air bypass conduit defined by lying upstream of said pressure control valve and by lying downstream of said first flow control means and said air flow rate meter to provide a reference pressure therefor;
   a source of constant pressure, connected to said air flow rate meter; and
   adjustable valve means associated with said source of constant pressure for changing said reference pressure.

3. An apparatus as defined by claim 2, further comprising an exhaust gas sensor coupled to said adjustable valve means for valve actuation in dependence on the magnitude of the signal from said sensor.

4. An apparatus as defined by claim 2, further comprising transducer means for sensing fluctuations of the pressure in the combustion chambers of said engine for determining the operation thereof, coupled to said adjustable valve means for adjustment according to the magnitude of the signal from said transducer.

5. An apparatus as defined by claim 2, further including controller means for actuating said adjustable valve means in dependence on engine conditions, wherein said adjustable valve means is an electromagnetic valve.

6. An apparatus as defined by claim 2, wherein said adjustable valve means is an electromagnetic valve and further comprising controller means for actuating said electromagnetic valve in cyclic manner in an on-off ratio defined by operational conditions.

7. An apparatus as defined by claim 2, further including electronic controller means for actuating said adjustable valve means, wherein said adjustable valve means is a threeway electromagnetic valve located at the junction of a conduit leading from said connecting line to said source of constant pressure.

8. An apparatus as defined by claim 2, wherein said adjustable valve means is a switching valve for providing selective communication between said air flow rate meter and said source of constant pressure and also between said air flow rate meter and said air intake tube.

9. An apparatus as defined by claim 7, further comprising flow throttle means disposed in said connecting line and also in the conduit between said source of constant pressure and said air flow rate meter.

10. An apparatus as defined by claim 2, wherein said source of constant pressure is the ambient air.

11. An apparatus as defined by claim 2, wherein said pressure control valve includes a diaphragm exposed on one side thereof to substantially atmospheric pressure;
    a valve closing element, attached to said diaphragm, for cooperation with said air bypass conduit to control air flow therethrough and including bore means for communication between respective end faces thereof.

12. An apparatus as defined by claim 2, wherein said air flow rate meter includes a symmetrically pivoted flap and said air flow control element is a control diaphragm coupled to said flap and defining a pressure chamber connected to receive pressure from said connecting line and from said source of constant pressure, and wherein the side of said control diaphragm remote from said pressure chamber is exposed to the intake tube pressure prevailing downstream of said pivoted flap.

13. An apparatus as defined by claim 12, wherein said pressure control valve further includes spring means for biasing said diaphragm.

14. An apparatus as defined by claim 12, wherein said diaphragm is composed of two membranes and including means for admitting to the space between said membranes a pressure different from the pressure prevailing in said chambers.

15. An apparatus as defined by claim 12, wherein said diaphragm includes two membranes between which atmospheric pressure prevails.

16. An apparatus as defined by claim 15, in which said two membranes have different surfaces exposed to pressure.

17. An apparatus as defined by claim 2, wherein said air flow rate meter is a movable piston disposed transversely with respect to the air flow in said air intake tube and actuated by differential pressure.

18. An apparatus as defined by claim 12, wherein said first flow control means is a symmetrically pivoted flap in said air bypass tube.

19. An apparatus as defined by claim 18, wherein said air flow rate meter and said first flow control means are operatively coupled by linkage means.

20. An apparatus as defined by claim 18, wherein said air flow rate meter and said first flow control means are disposed on a common shaft.

21. An apparatus as defined by claim 18, further comprising electromechanical means for effecting motion of said first flow control means simultaneously with motion of said air flow rate meter.

22. An apparatus as defined by claim 18, further comprising pneumatic means for effecting motion of said first flow control means simultaneously with motion of said air flow rate meter.

23. An apparatus as defined by claim 18, further comprising hydraulic means for coupling the motion of said first flow control means to the motion of said air flow rate meter.

24. An apparatus as defined by claim 2, wherein said source of constant pressure is said air intake tube upstream of said air flow rate meter.

* * * * *